United States Patent
Thompson, Jr. et al.

(10) Patent No.: US 6,719,097 B1
(45) Date of Patent: Apr. 13, 2004

(54) METHOD AND APPARATUS FOR TRANSPORTING BAGGAGE OUT OF A BAGWELL

(75) Inventors: Victor H. Thompson, Jr., Burleson, TX (US); Benon C. Jarka, Fort Worth, TX (US)

(73) Assignee: Vic Thompson Company, Fort Worth, TX (US)

( * ) Notice: Subject to any disclaimer, the term of this patent is extended or adjusted under 35 U.S.C. 154(b) by 29 days.

(21) Appl. No.: 10/099,613

(22) Filed: Mar. 14, 2002

(51) Int. Cl.⁷ .............................................. B65G 11/14
(52) U.S. Cl. ........................................ 186/59; 414/787
(58) Field of Search .................. 414/21, 395, 396, 414/398, 522, 787, 800, 809, 539; 186/59, 60, 68, 69; 193/2 R, 38, 35 TE

(56) References Cited

U.S. PATENT DOCUMENTS

| | | | | |
|---|---|---|---|---|
| 2,613,788 A | * | 10/1952 | McLaughlin | 193/35 TE |
| 3,068,983 A | * | 12/1962 | McLaughlin | 193/35 TE |
| 3,127,978 A | * | 4/1964 | Zuercher | 198/812 |
| 3,704,773 A | * | 12/1972 | Lingg et al. | 198/410 |
| 5,046,913 A | * | 9/1991 | Domek et al. | 414/522 |
| 5,685,416 A | * | 11/1997 | Bonnet | 198/812 |
| 6,035,971 A | * | 3/2000 | Lindstrom et al. | 186/61 |
| 6,279,721 B1 | | 8/2001 | Lyngso et al. | |
| 6,397,999 B1 | * | 6/2002 | Taylor | 193/35 TE |

OTHER PUBLICATIONS

Retractable Dispatch Unit MSL 800–RT brochure, Magnasort MSL Series Load Conveyor Products, Magnasort Baggage System Products, 1 sheet, no date.

* cited by examiner

Primary Examiner—Dean J. Kramer
(74) Attorney, Agent, or Firm—Geoffrey A. Mantooth

(57) ABSTRACT

A transport apparatus transports objects from one location to another, and in particular between a check station and a conveyor system. The apparatus has an arm that is structured and arranged to be located in a bagwell near the check station. The arm is telescoping and is contained in a base unit. A platform for receiving baggage is coupled to a free end of the arm and extends over the base unit when the apparatus is retracted. The platform has a roller that bears on the floor. As the arm extends and retracts, the platform rolls on the floor. Internal roller bearings allow the arm to telescope. The arm and the platform can be adjusted in height and the widths of the base unit and platform can be adjusted to the bagwell.

15 Claims, 17 Drawing Sheets

METHOD AND APPARATUS FOR TRANSPORTING BAGGAGE OUT OF A BAGWELL

FIELD OF THE INVENTION

The present invention relates to methods and apparatuses for transporting cargo out of a bagwell, and in particular to transporting baggage from a baggage drop off location.

BACKGROUND OF THE INVENTION

In airline terminals, passengers purchase tickets, receive boarding passes and check baggage at ticket counters. A well, or bagwell, is provided to the side of the ticket counter or between two counters. A passenger places suitcases and other baggage in the well. An airline ticket agent tags the baggage. Some bagwells are equipped with scales wherein the baggage can be weighed.

Behind the counter, from the passenger's point of view, is a conveyor system. The airline ticket agent removes the baggage from the bagwell and places the baggage on the conveyor. The conveyor then transports the baggage to the baggage handlers, who load the baggage into the cargo hold of the appropriate aircraft.

For the ticket agent, the act of picking the baggage up and moving it from the bagwell to the conveyor system can be difficult and tiring. This is true even though the distance is short, on the order of only a few feet. The bags can be large and heavy and thus hard to lift. Such lifting and moving is conducive to back and other injuries.

One solution to the problem of moving baggage from the bagwell to the baggage conveyor is to provide a surface, such as a slide. Such a surface would allow a ticket agent to simply slide the baggage from the bagwell to the baggage conveyor, thereby eliminating the need to lift the baggage. Unfortunately, such a system needs to be retractable in many airports, and in particular in U.S. airports. This is because ticket counters tend to be long with many ticket stations located along the counter. A narrow aisle is created between the ticket counter and the baggage conveyor. Airline personnel use the aisle to access a ticket station. International airports provide walkways along the conveyor and between ticket stations to allow ingress and egress to the aisle. But, U.S. airports have uninterrupted counters with no walkways between many ticket stations. Any obstruction of the aisle also obstructs access of personnel to man, or operate, a ticket station. Thus, any system for simplifying the movement of baggage from the bagwell to the baggage conveyor necessarily spans the aisle and blocks foot traffic along the aisle.

In the prior art, airports having walkways between ticket counters to allow ingress and egress to the aisle use fixed ramps or slides. Some ramps may be equipped with a conveyor to move the baggage across the aisle to the baggage conveyor.

Prior art bagwell baggage movers in U.S. airports are configured to only temporarily block the aisle. One such prior art device has a ramp that is stowed in a vertical position at the ticket agent side of the bagwell. A passenger places baggage in the bagwell. When the baggage is ready to be transported from the bagwell to the baggage conveyor, the ramp pivots down across the aisle. The pivoting ramp increases the risk of injury, should someone be caught underneath during deployment. Another prior art device is available from Magnasort and uses an extendible conveyor belt. The unit is located in the bagwell and projects, even when not extended, into the aisle. Thus, the risk of injury to airline personnel walking into the unit appears to be high.

Therefore, what is needed is a retractable system the eases the movement of baggage from a bagwell, typically located next to a ticket counter, to a baggage conveyor, while minimizing the obstruction of the aisle in a safe manner.

SUMMARY OF THE INVENTION

It is an object of the present invention to provide a method and apparatus that enables the movement of baggage from a bagwell to a baggage conveyor.

It is another object of the present invention to provide a method and apparatus that enables the movement of baggage from a bagwell to a baggage conveyor, which minimizes the blockage of the distance between the bagwell and the baggage conveyor.

The present invention provides an apparatus for transporting objects from a check station to a conveyor system. The apparatus comprises an arm, a roller and a platform. The arm is structured and arranged to be located near the check station. The arm is capable of extending and retracting along its length and has a free end. The roller is mounted in proximity to the free end of the arm. The roller is structured and arranged to bear on a bearing surface during the extension and retraction of the arm. The platform is coupled to the arm and overlies the arm so as to be capable of receiving objects. The platform moves as the arm extends and retracts.

In accordance with one aspect of the present invention, the arm comprises a telescoping arm.

In accordance with another aspect of the present invention, the telescoping arm comprises arm lengths having at least three sides with bearings on each side between the telescoping arm lengths.

In accordance with another aspect of the present invention, the apparatus further comprises floor brackets for coupling the arm to the bearing surface, with the floor brackets allowing the horizontal orientation of the arm to be adjusted.

In accordance with another aspect of the present invention, the roller depends from the arm a distance that is adjustable.

In accordance with another aspect of the present invention, a handle is coupled to the platform. The handle has a roller that is structured and arranged to contact objects on the platform. The roller assists in discharging objects from the platform onto the conveyor.

In accordance with another aspect of the present invention, the platform comprises a scale.

In accordance with still another aspect of the present invention, the platform has an area dimension with at least one of the dimensions being adjustable.

The present invention also provides a system for checking baggage. The system comprises a check station, a conveyor separated from the check station by a distance and a well located adjacent to the check station. An arm is structured and arranged to be located in the well, with the arm capable of extending and retracting along its length across the distance. A base unit is located in the well and contains a portion of the arm. A platform is coupled to the arm, with the platform overlying the base unit so as to be capable of receiving baggage. The platform crosses the distance when the arm extends and retracts.

In accordance with one aspect of the invention, the arm comprises a telescoping arm. The telescoping arm comprises arm lengths having at least three sides with bearings on each side between the telescoping arm lengths.

In accordance with another aspect of the present invention, the base unit further comprises floor brackets for coupling the arm to a bearing surface. The floor brackets allow the height of the arm to be adjusted.

In accordance with another aspect of the present invention, the system comprises a roller mounted in proximity to the free end of the arm, with the roller structured and arranged to bear on a bearing surface during the extension and retraction of the arm.

The present invention also provides a method of transporting baggage between a bag conveyor. A platform is provided in the bagwell, the platform is structured and arranged to receive baggage. The platform is telescoped from the bagwell to the baggage conveyor. The platform is retracted back into the bagwell.

In accordance with another aspect of the present invention, the method comprises the step of exposing a base unit in the bagwell as the platform telescopes to the baggage conveyor.

The present invention also provides the method of installing a transport apparatus in a bagwell. The transport apparatus has a telescoping arm and a platform coupled to one end of the arm. The platform has at least one roller structured and arranged to bear on a floor. The arm is located in the bagwell and the height of the arm is adjusted. A cover is placed over the arm in the bagwell. The height of the platform is adjusted by adjusting the height of the roller.

In accordance with one aspect of the method, the width of the cover in the bagwell is adjusted relative to the bagwell. The width of the platform is also adjusted.

BRIEF DESCRIPTION OF THE DRAWINGS

FIG. 7 is a side view showing the interior locations of the bearings. FIG. 8 is a longitudinal cross-sectional view, taken along lines VIII—VIII of FIG. 7. FIG. 9 is a transverse cross-sectional view, taken along lines IX—IX of FIG. 7. FIG. 10 is a transverse cross-sectional view, taken along lines X—X of FIG. 7. FIG. 11 is a transverse cross-sectional view, taken along lines XI—XI of FIG. 7. FIG. 12 is a transverse cross-sectional view, taken along lines XII—XII of FIG. 7.

DESCRIPTION OF THE PREFERRED EMBODIMENT

Figure 1:
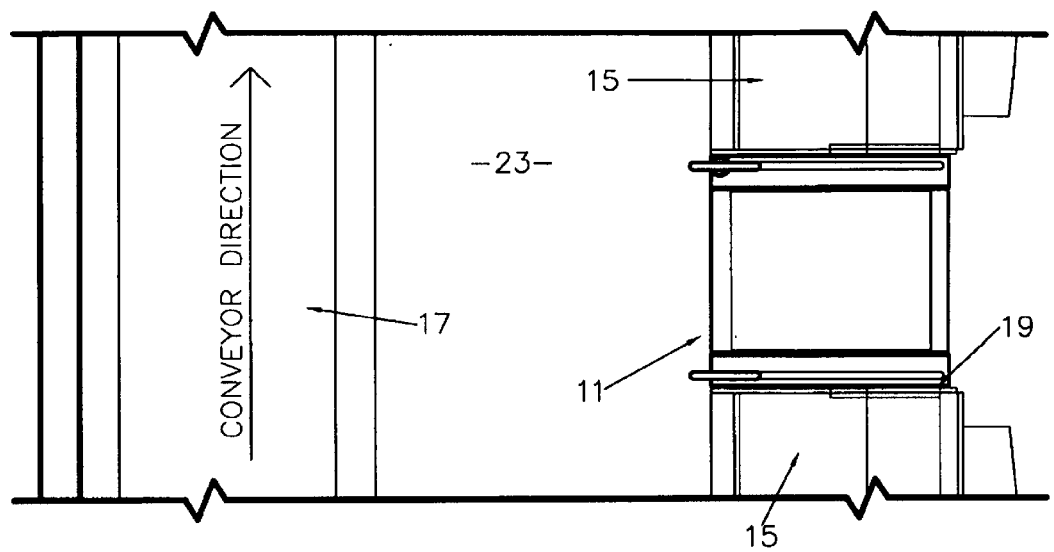
FIG. 1 is a plan view of a check station and a baggage conveyor, equipped with the transport apparatus of the present invention, in accordance with a preferred embodiment, shown in the retracted position.

The transport apparatus 11 of the present invention can be used in a variety of applications. One application in particular is the transport of baggage from one location to another location over a relatively short distance. Specifically, referring to FIGS. 1–4, baggage 13 can be transported from a check station 15 to a nearby conveyor system 17.

Many airlines have a passenger area equipped with one or more check stations 15. Passengers go to the check stations 15, such as a ticket counter, for a variety of reasons, including to purchase tickets, obtain boarding passes, change flights and check baggage. For example, in checking baggage, the baggage is separated from the passenger for loading into a cargo hold of an aircraft. An airline agent must match the baggage to the particular aircraft to ensure that the passenger and his baggage are on the same aircraft. In addition, at the check stations, agents may perform other activities such as weighing the baggage, security checks and the like.

When a passenger wishes to check baggage, the baggage 13 is placed in a bagwell 19. A bagwell 19 is a space located next to a check station 15.

Figure 3:
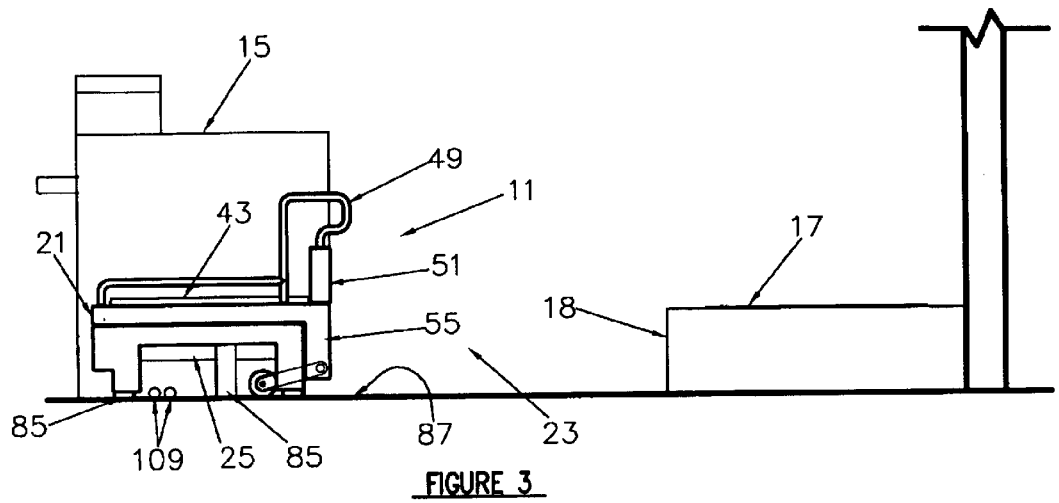
FIG. 3 is an elevational view of the arrangement of FIG. 1.

When the bagwell 19 is equipped with the transport apparatus 11 of the present invention, the baggage is placed directly on the apparatus (see FIGS. 1 and 3). The apparatus 11 has a platform 21 that serves as the transport surface of the bagwell; the baggage is placed on the platform 21.

A baggage conveyor system 17 is close by the bagwell 19, typically separated by an aisle 23. As several check stations may be linearly congregated, the aisle 23 may be relatively long. Airline agents, such as customer service agents, use the aisle 23 to move to and from check stations.

Figure 2:
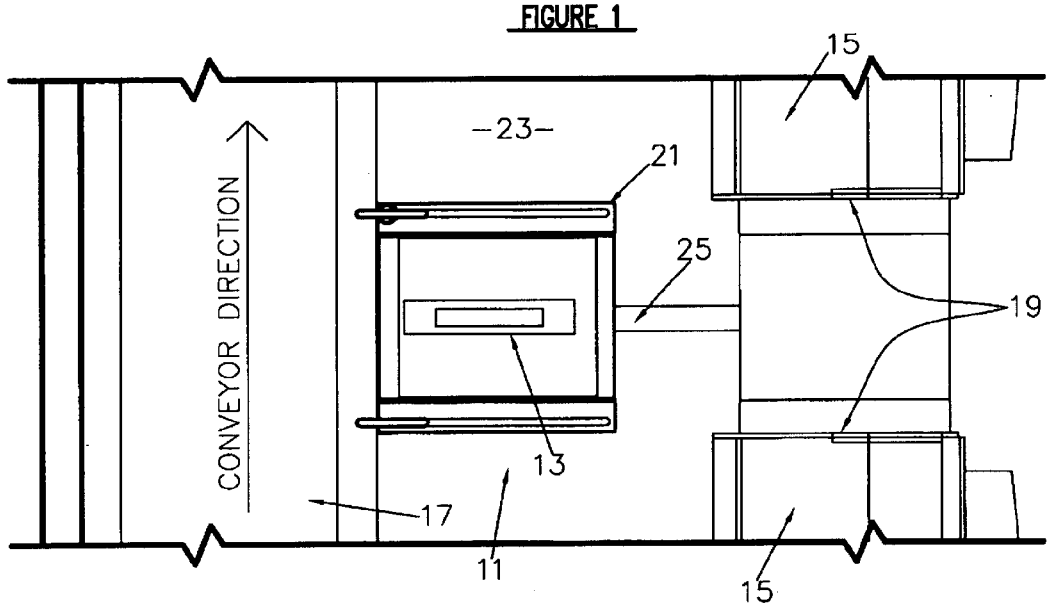
FIG. 2 is a plan view of the arrangement of FIG. 1, shown with the apparatus in an extended position.
Figure 4:
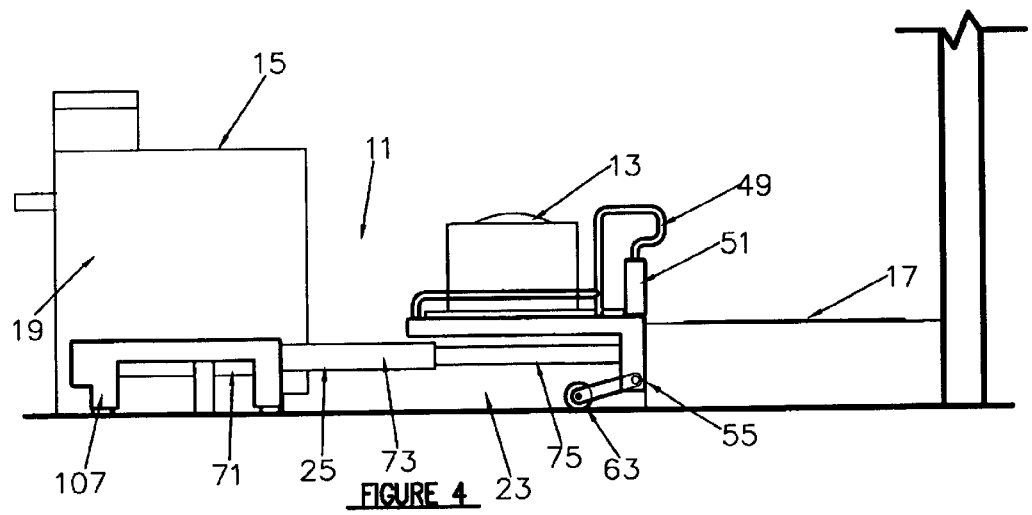
FIG. 4 is an elevational view of the arrangement of FIG. 2.

When an airline agent is ready to move the baggage 13 from the bagwell 19 to the baggage conveyor 17, the agent manually moves the platform 21 and any baggage thereon across the aisle 23 to the baggage conveyor (see FIGS. 2 and 4). The platform 21 moves smoothly and easily across the aisle and abuts the skirt 18 or side of the baggage conveyor 17. The top surface of the platform 21 is at the same, or a slightly higher elevation, as the top of the conveyor 17. The agent then manually moves the baggage from the platform 21 to the conveyor 17, wherein the baggage is transported to a location for sorting and loading into an aircraft. The agent moves the platform 21 back into the bagwell 19 to once again free the aisle 23 of an obstruction (see FIGS. 1 and 3). Thus, airline personnel need not lift baggage to move it from the bagwell 19 to the conveyor system 17. Furthermore, the aisle 23 is only temporarily blocked during the actual, transport procedure.

Figure 5:
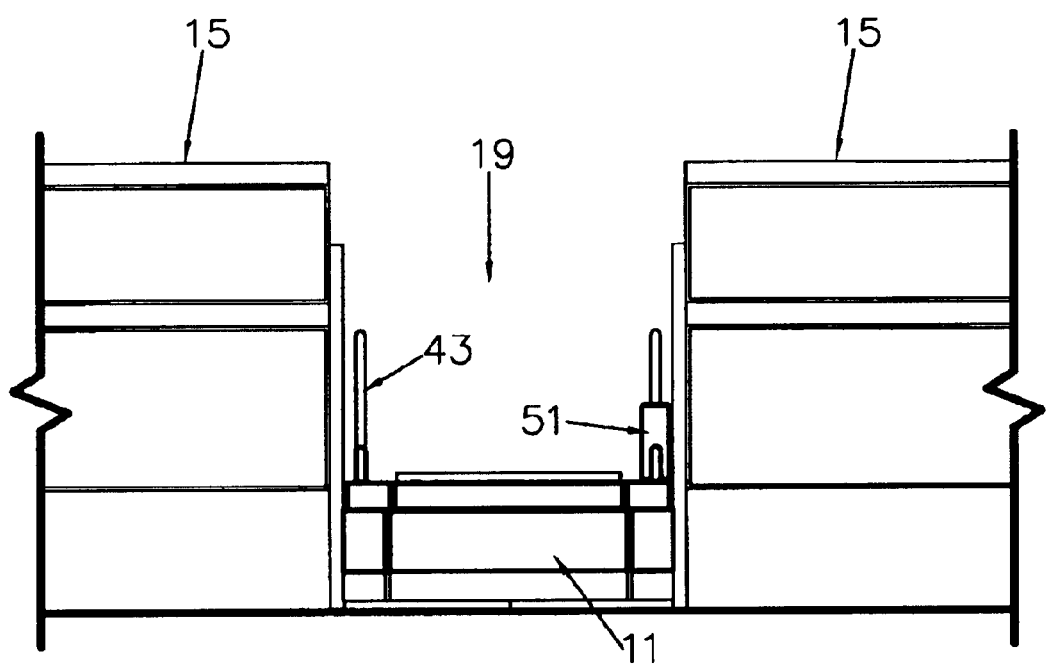
FIG. 5 is an elevational view showing the transport apparatus from the public's, or passenger's, side of the check stations, or ticket counters.

The transport apparatus 11 will now be described in more detail. The apparatus includes the platform 21, a base unit 22 and an arm assembly 25. In the description that follows, reference will be made to "front" and "rear". As shown in FIGS. 1 and 2, the "front" is on the passenger side of the check station 15, while "rear" is on the baggage conveyor 17 side. (With reference to the orientation of FIGS. 1 and 2, the "front" side is the right side, while the "rear" side is the left side.) The platform 21 extends to the rear toward the conveyor 17 and retracts to the front. FIG. 5 shows a view of the front side of the bagwell 19 and the transport apparatus 11.

Figure 6:
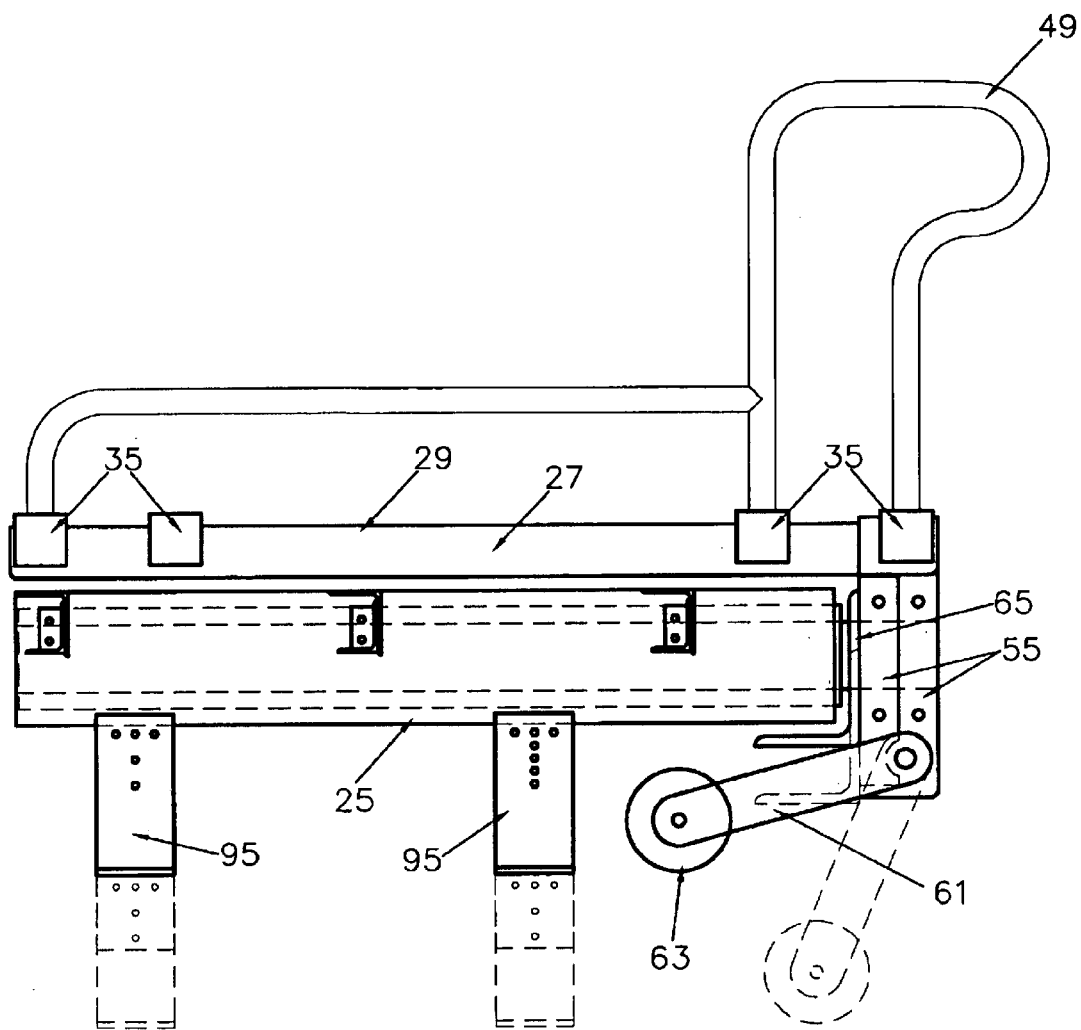
FIG. 6 is a side elevational schematic view of the transport apparatus illustrating the height adjustment of the base unit frame and of the rollers.
Figure 18:
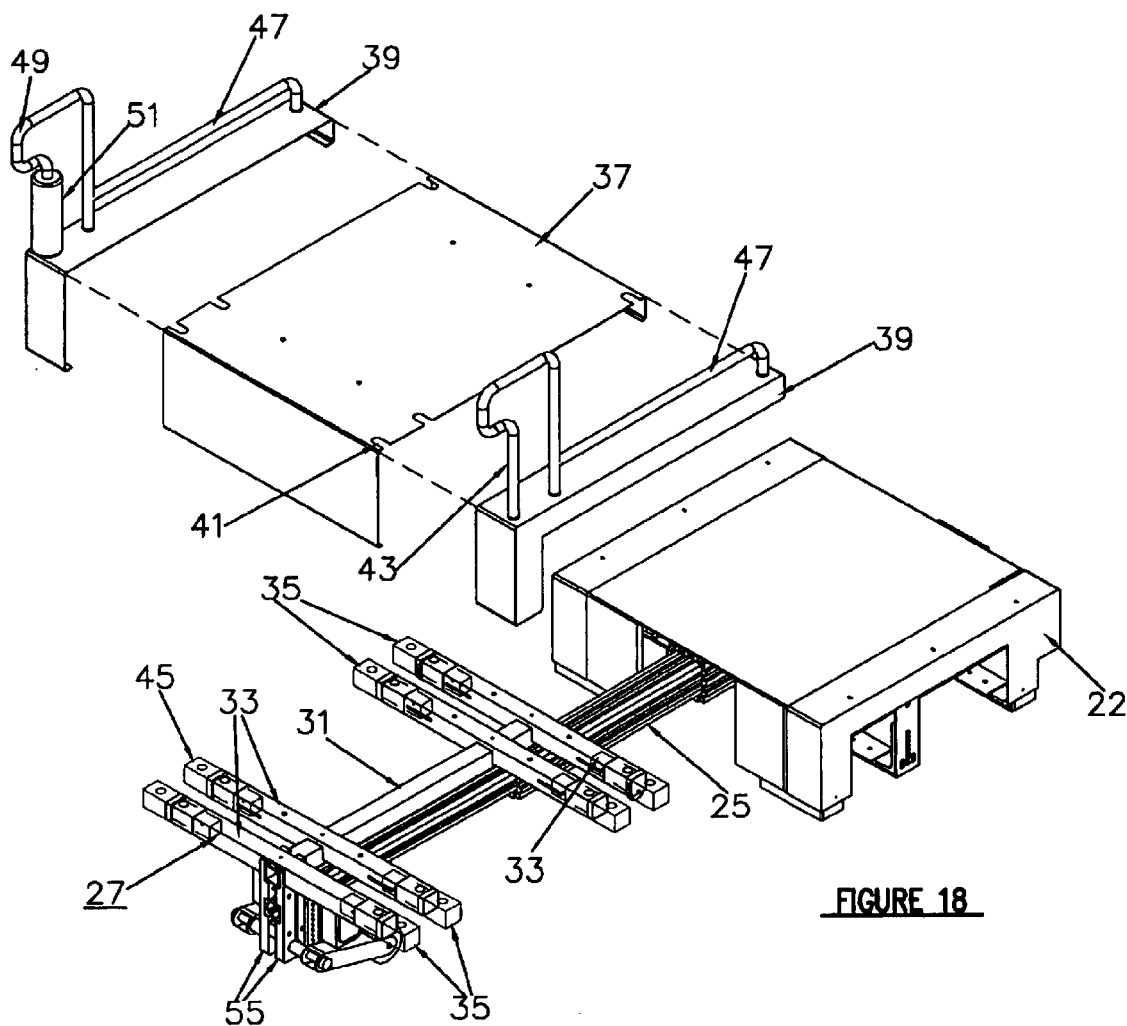
FIG. 18 is an isometric view of the transport apparatus of FIG. 16, shown with the cladding on the platform exploded.

Referring to FIGS. 6 and 18, the platform 21 has a frame 27 and cladding 29 to cover the frame. The frame 27 can be rectangular, or as shown in the preferred embodiment, "I" shaped. An "I" shaped frame allows the width of the platform to be adjusted to accommodate bagwells 19 of different widths.

Figure 15:
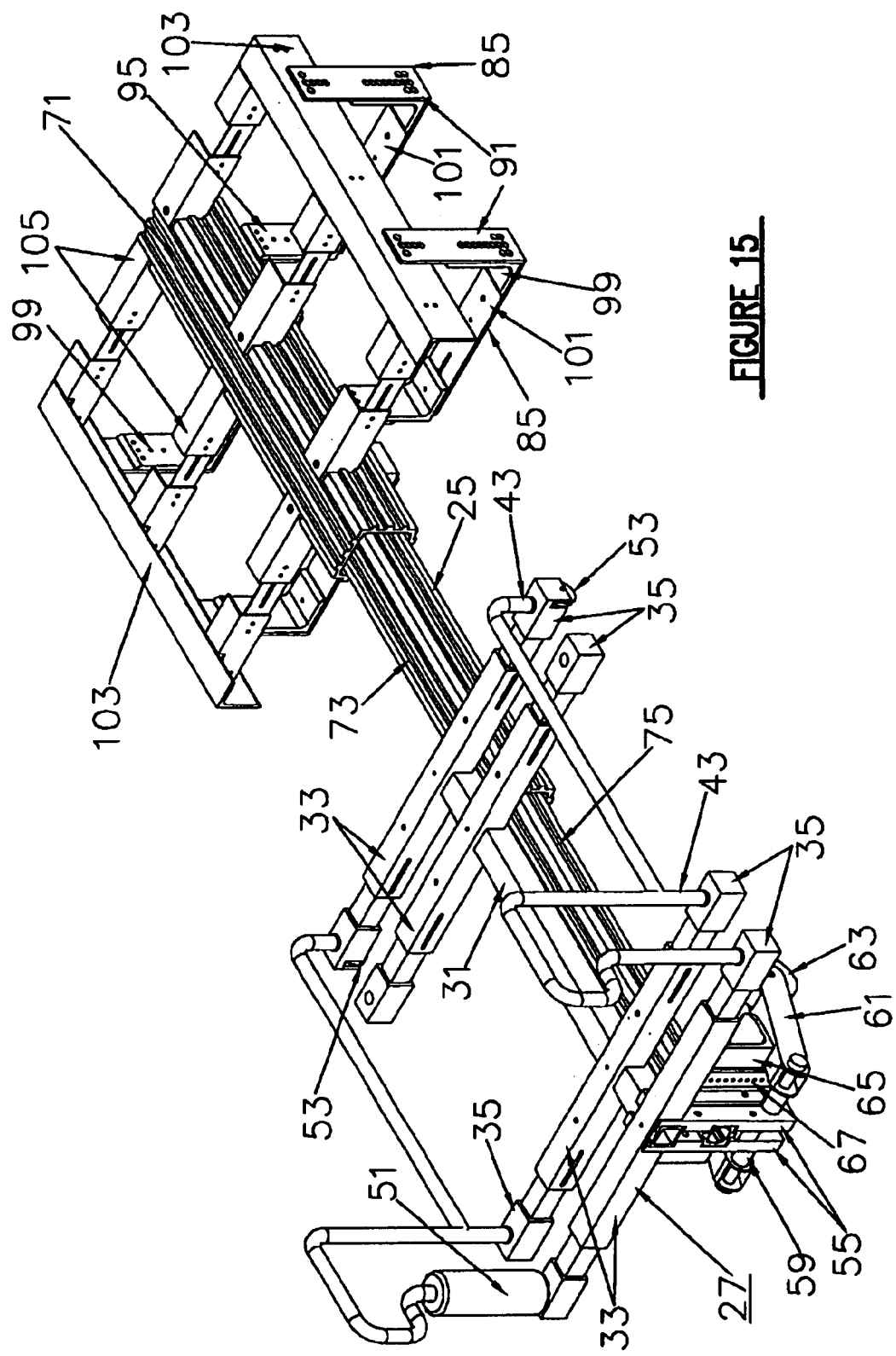
FIG. 15 is an isometric view of the frames of the transport apparatus, shown in an extended position from the customer service agent's side.

The frame 27 has a central beam 31 extending from the rear toward the front. Transverse ribs 33 are coupled to the central beam 31. The ribs 33 are tubes having telescoping end pieces 35. The end pieces 35 can be telescoped inside of the ribs 33 to adjust the length of the ribs and thus adjust the width of the frame 27. The end pieces 35 are secured with fasteners. In FIG. 18, the interior of the ribs is shown to illustrate the telescoping end pieces. The ends of the ribs are shown collapsed. In FIG. 15, the ends of ribs are shown extended so as to widen the frame.

FIG. 15 shows a platform frame 27 without any cladding 29. FIG. 18 shows the cladding 29 exploded off of the platform frame 27. There is a central piece 37 of cladding that covers the rear side of the platform, extends on top of the ribs 33 and the central beam 31 and covers the front side of the platform. Overlapping the sides of the central piece 37 of cladding are end pieces 39. The cladding pieces 37, 39 are coupled to the frame 27 by fasteners such as screws. The central piece 37 of cladding has slots 41 therein to receive posts 43 and still allow adjustability of the end pieces 39. The end pieces 39 of cladding abut the ends of the ribs 33.

Posts 43 extend through the cladding 29 into openings 45 into the ends of the ribs 33 (see FIG. 15). The posts 43 are coupled together by rails 47 along the sides of the platform. The rails are low and serve to confine baggage on top of the platform. At the rear side, the rails are higher and the posts and rails form handles 49. An operator grasps a handle to push and pull the platform between the extended and retracted positions. A roller 51 is provided on the rear post that is located downstream of the other rear post. The roller allows a piece of baggage to more easily round that downstream post when the baggage is partway on the moving conveyor 17 and partway on the platform. The moving conveyor will typically push the baggage into contact with the roller.

The ends of the frontmost rib can be equipped with respective rollers 53 that depend down, as shown in FIG. 15. The rollers 53 contact the top surface of the cladding on the base unit 22 and prevent the front end of the. platform from sagging and scratching the base unit.

The platform 21 is mounted to the arm assembly 25 by an arrangement of mounting posts 55 (see FIGS. 6 and 15). In the preferred embodiment, the mounting post arrangement includes four vertical posts or bars 55 clamped together so as to form a square rectangle in top view. The posts 55 are bolted together. Referring to the orientation of FIG. 15, there are two posts on the left side and two posts on the right side. There are also two front posts and two rear posts. The right side posts and left side posts bolt to each other and clamp onto an end portion of the inner arm of the arm assemblies. Likewise, the right side and left side posts clamp to the rear end of the central beam 31 of the frame 27. Thus, the mounting post arrangement 55 mounts the platform frame 27 to the arm assembly 25.

In addition, an axle 59 is clamped between the front posts and the rear posts, so as to be perpendicular to the central beam 31. The axle 59 is fixed. The ends of the axle extend out to each side. Pivotally coupled to each end of the axle 59 is a roller yoke 61 containing a roller 63. Thus, the roller 63 can turn within the yoke 61 and the yoke can pivot or swing about the axle 59 (as shown in FIG. 6). An angle bracket 65 is provided on the front side of the mounting post arrangement 55 for each yoke 61. The angle brackets 65 serve as stops to limit the upward motion of the roller yokes 61. The angle brackets can be adjusted in height as shown in FIG. 6. By adjusting the angle bracket height, the stop position of the rollers can be adjusted. Each one of the angle brackets 65 is coupled to a respective other angle bracket 67 mounted to either the right side or left side of the mounting post arrangement (see FIG. 20). By adjusting the position of the angle bracket 65 relative to the angle bracket 67, the height of the stop is adjusted.

The arm assembly 25 is shown in FIGS. 7–12. The arm assembly 25 extends and retracts along its length. This longitudinal extension and retraction eliminates the need for a hinge. In the preferred embodiment, the arm assembly is telescoping and has several arm lengths, namely an outer arm 71, an intermediate arm 73 and an inner arm 75. The number and length of the arm lengths can vary depending on the distance the arm arrangement needs to extend. In the preferred embodiment, the arm assembly extends between two to three times its length to span the aisle 23.

Figure 7:
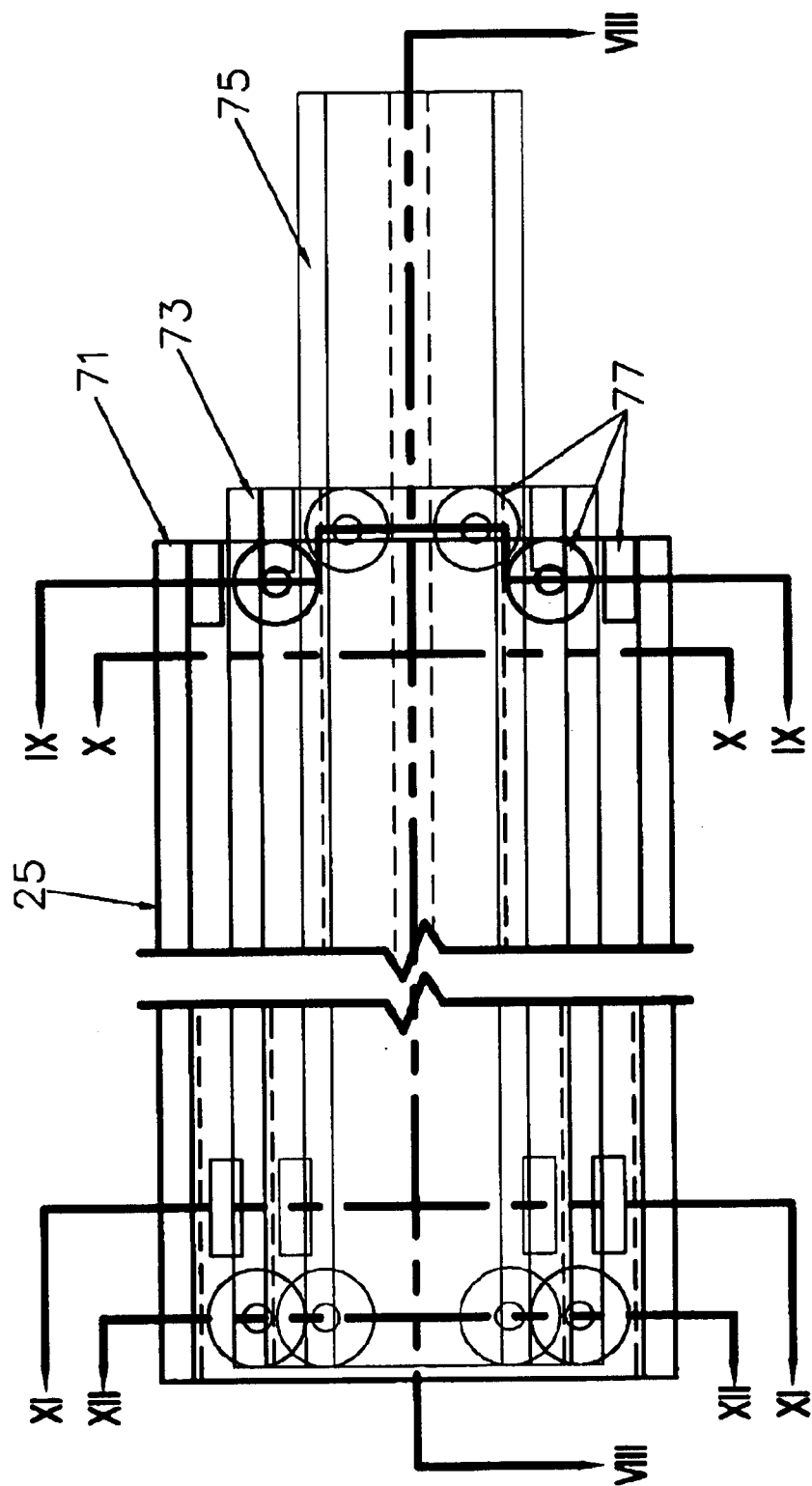
FIGS. 7–12 are views showing the arm assembly.
Figure 8:
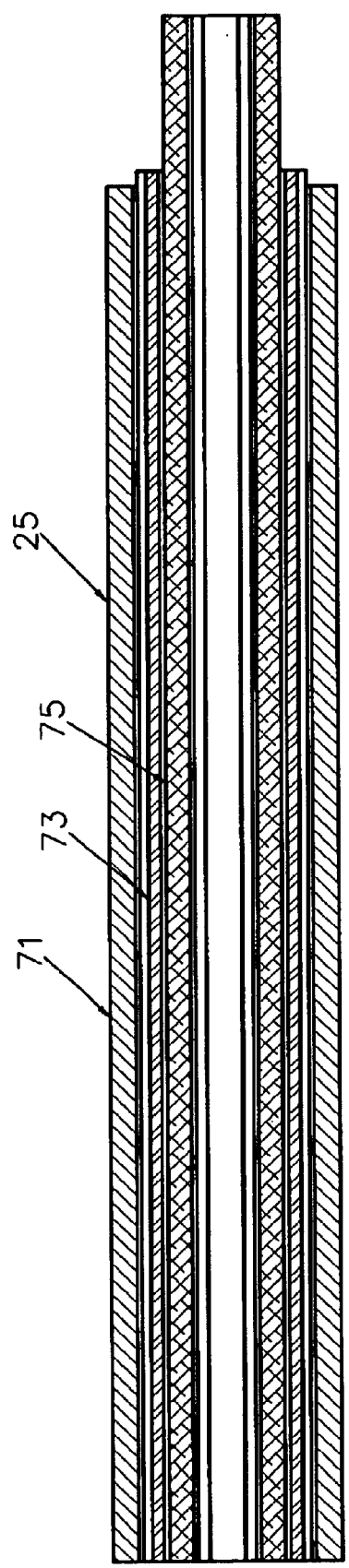
Figure 9:
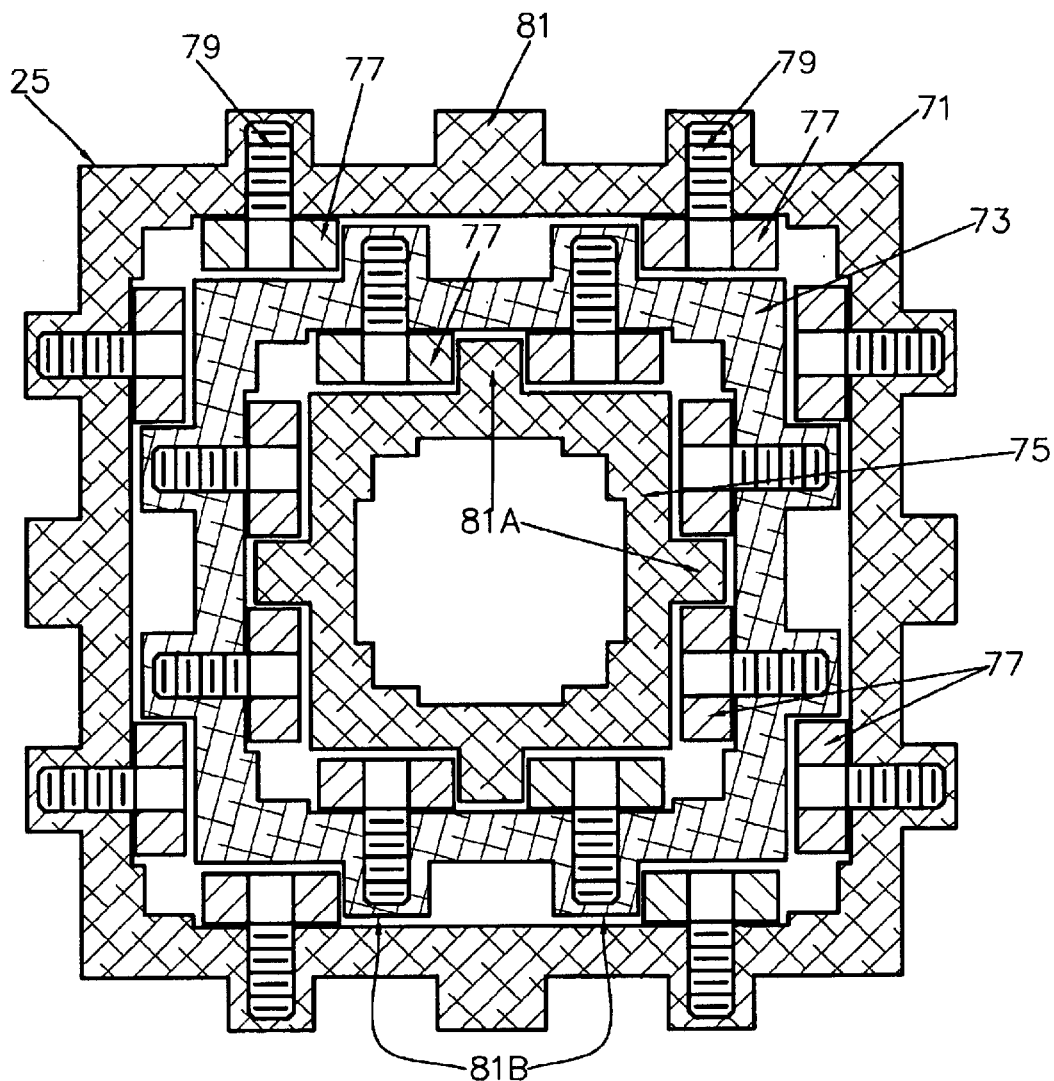
Figure 10:
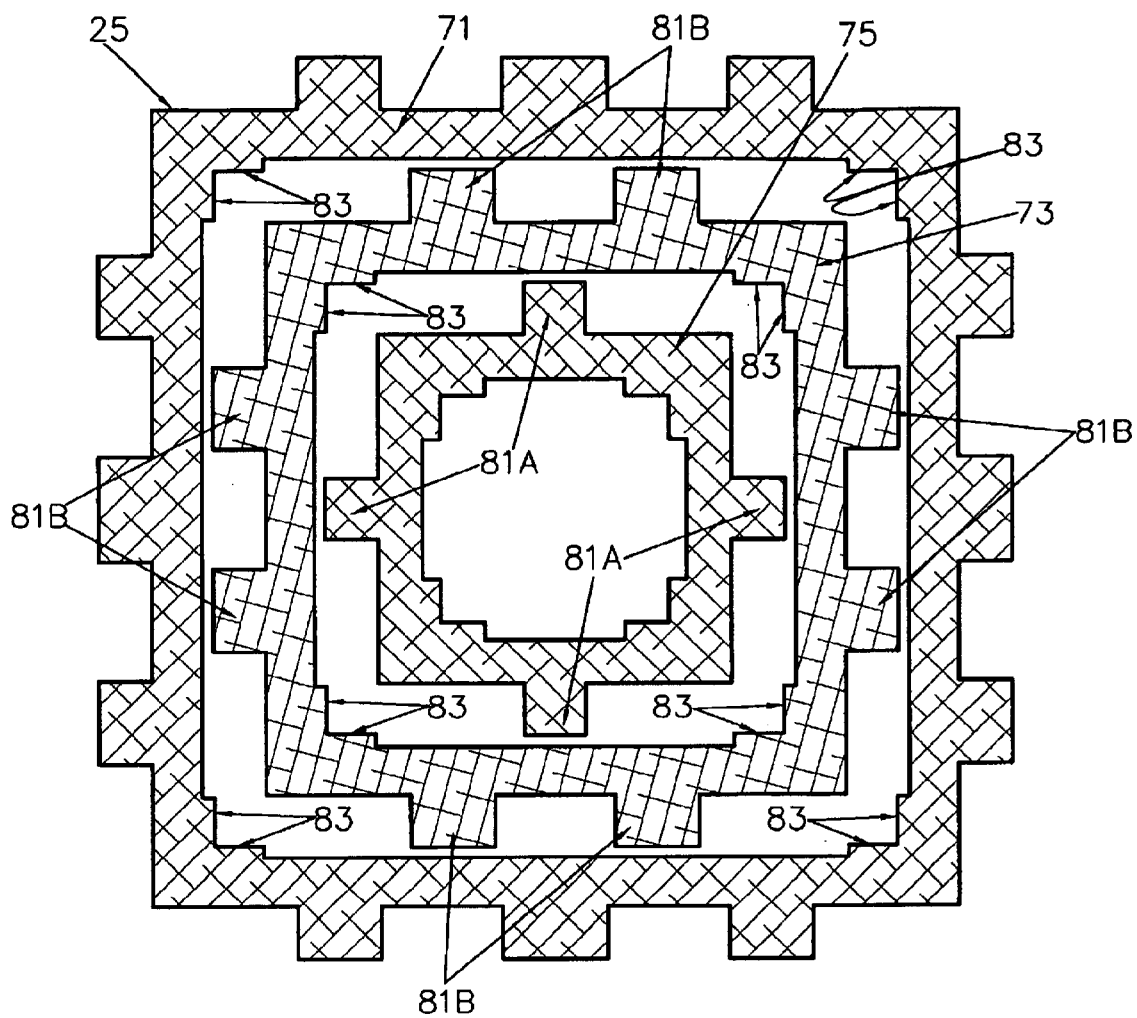

In the preferred embodiment, the arms 71, 73, 75 are hollow rectangular tubes. The arms are telescoped within one another as shown in FIGS. 7 and 8 by sets of roller bearings 77. At each end of the arm assembly, eight bearings couple the inside and outside arms together. Each roller bearing 77 is secured to a wall of an arm by a bolt 79. The portion of the wall receiving the bolt is thickened. In general, bearings that extend inwardly, as shown in FIG. 9, bear on longitudinal ribs 81 on the outside of the respective arm. For example, referring to FIG. 9, there is shown a cross-sectional view of the rear end of the arm assembly 25. The inner arm 75 has a central rib 81A extending down the length of each side surface. The central ribs 81A provide the bearing surfaces for the roller bearings 77. The intermediate arm 73 has positioned a roller bearing on each side of the central ribs 81A. Thus, there are two top bearings, two bottom bearings, two right side bearings and two left side bearings, referring to the orientation shown in FIG. 9. The intermediate arm 73 is likewise coupled to the outer arm 71. The outer arm has two roller bearings for each of the four sides of the intermediate arm. Thus, there are two roller bearings for the top and the intermediate arm, two roller bearings for the bottom of the intermediate arm, two roller bearings for the right side and two roller bearings for the left side of the intermediate arm. The roller bearings bear on the ribs 81B extending outwardly from the intermediate arm. These ribs 81B also serve to receive the bolts of the roller bearings that support the inner arm 75. FIG. 10 shows a view of the arm assembly without rollers. As the inner arm 75 is moved relative to the intermediate arm 73, the rollers contact the sides of the ribs 81A and support the inner arm. Likewise, the rollers of the outer arm 71 contact the sides of the ribs 81 B and support the intermediate arm 73.

Figure 11:
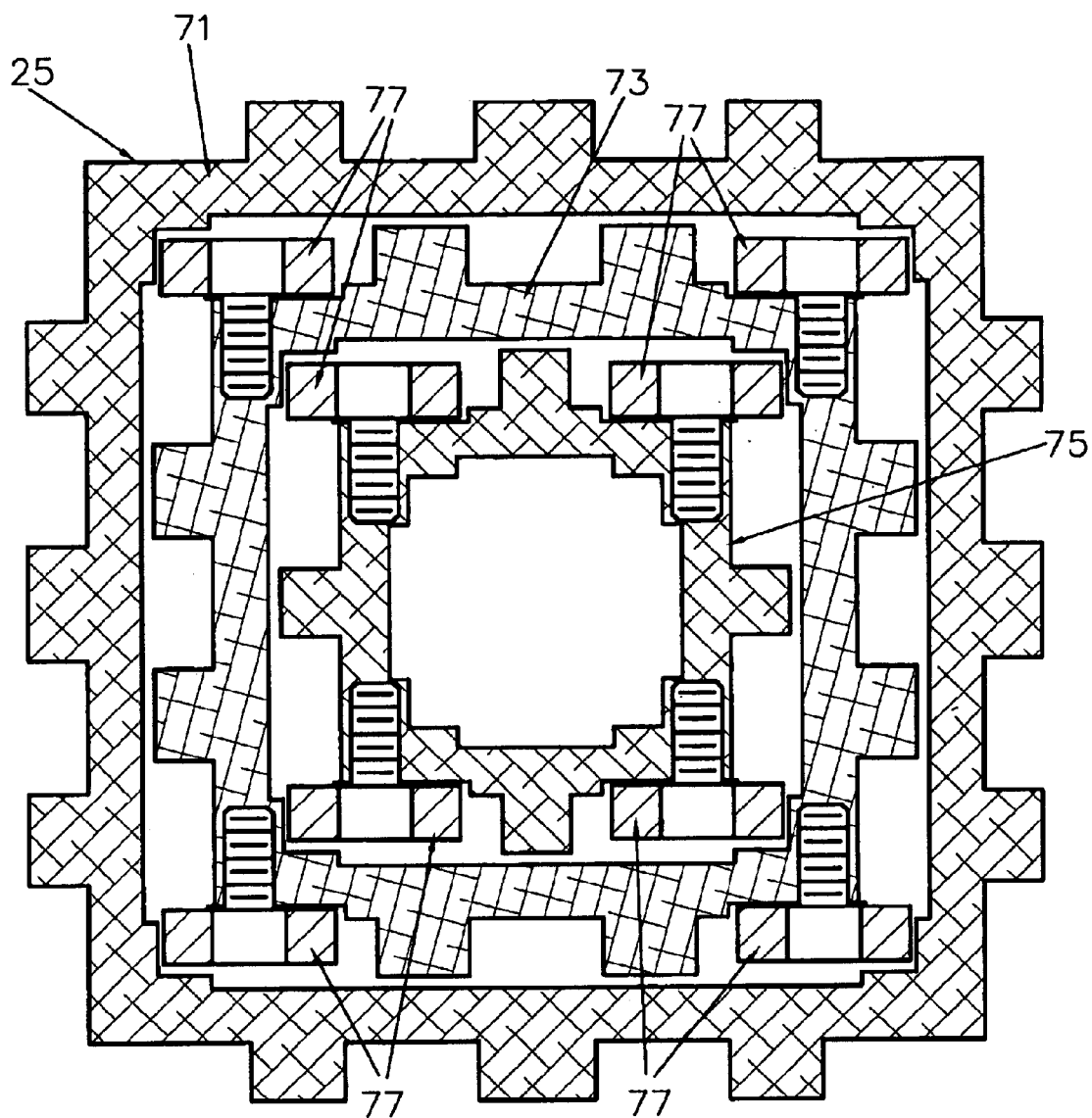
Figure 12:
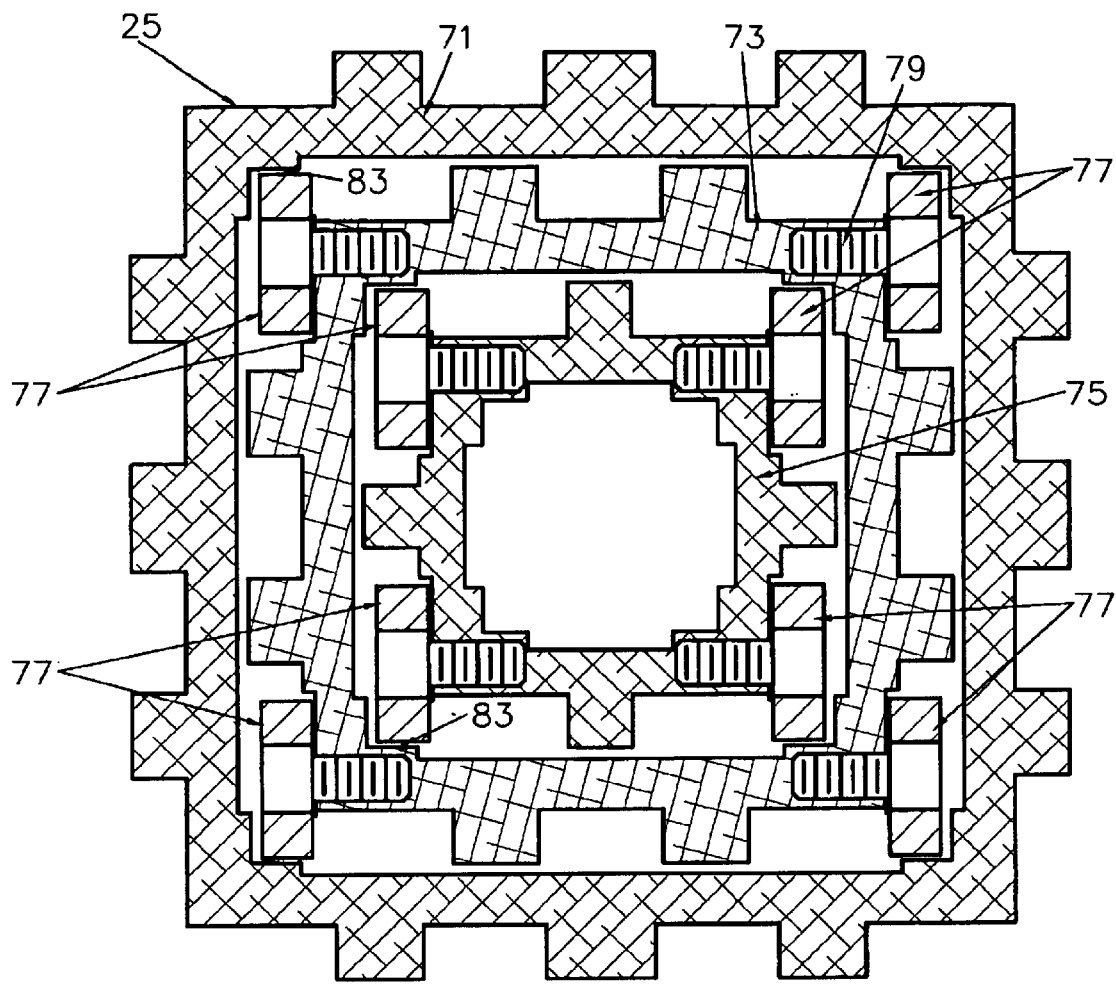

FIGS. 11 and 12 show the set of roller bearings 77 at the front end of the arm assembly 75. The bearings 77 in FIGS.

11 and 12 extend outwardly and bear on inner surfaces of the outermost arms. The inner arm 75 has two roller bearings mounted on its top side, two roller bearings mounted on its bottom side, two roller bearings mounted on its right side and two roller bearings mounted on its left side (referring to the orientation of FIGS. 11 and 12). The roller bearings 77 are mounted by bolts 79 threaded into the walls or sides of the inner arm. The rollers 77 bear on flat surfaces 83 in the corners of the intermediate arm 73. In order to receive the bolt for the outer rollers in the intermediate arm, the wall thickness of the intermediate arm in the corners is wider than the wall thickness elsewhere. The intermediate arm 73 has two roller bearings on its top surface, two roller bearings on its bottom surface, as shown in FIG. 11, and two roller bearings on its right side and two roller bearings on its left side, as shown in FIG. 12. The roller mounted bearings mounted on the intermediate arm 73 bear in the corners 83 of the outer arm 71.

The bearings are staggered on the inner arm front and rear, as shown in FIG. 7. Likewise, the bearings are staggered front and rear on the intermediate arm. Stops are provided so that the inner and intermediate arms cannot be extended out so as to disengage the rollers.

Thus, the arm assembly 25 allows smooth telescoping action of the inner arm 75 and the intermediate arm 73 during extension and retraction. The arms are prevented from wobbling with respect to each other by the roller bearings 77 located at each end and on each side.

The base unit 22 will be described with reference to FIGS. 15 and 20. The base unit has transverse support structures 85 that support the outer arm 71 up off of the floor 87 (see FIG. 4). Each support structure 85 is approximately "W" in shape, having a central elevated portion 89 and end elevated portions 91. The central portion 89 is an inverted "U" shaped piece coupled to vertical angle brackets 95. The end portions 91 are plates coupled to vertical angle brackets 99. On each side of the arm assembly, the angle brackets 95, 99 are coupled to each other by a plate 101. The support structures 85 are coupled together by angle brackets 103 extending front to rear at the plates 97. The support structures, with the angle brackets 95, 99, allow the height of the central portion 89 and the angle brackets 103 to be adjusted. Telescoping ribs 105 extend between, and couple to, the outer arm 71 and the angle brackets 103. The ribs 105 are adjustable in length so as to match the width of the bagwell.

Figure 16:
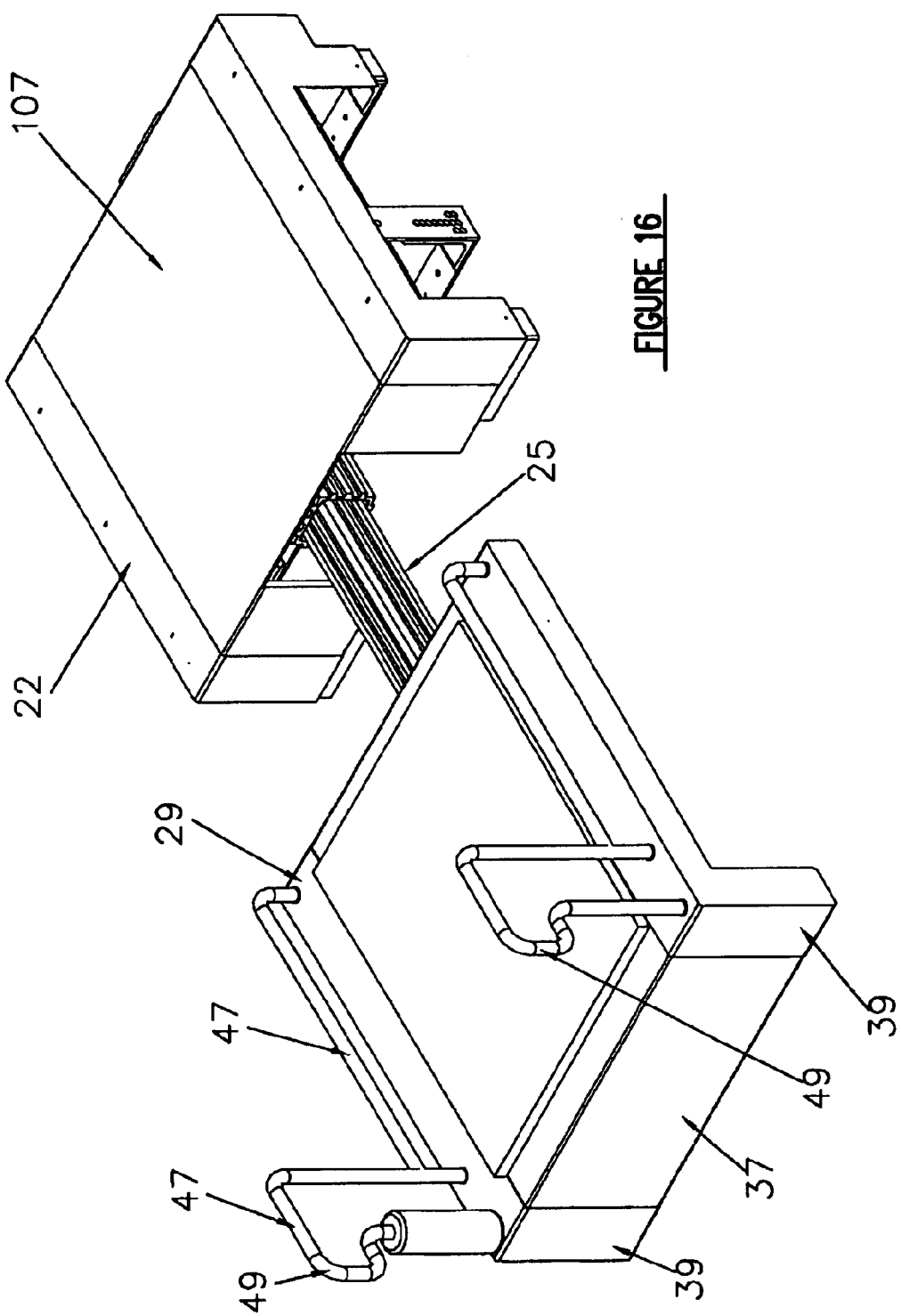
FIG. 16 is an isometric view of the transport apparatus of FIG. 15, shown with cladding.
Figure 17:
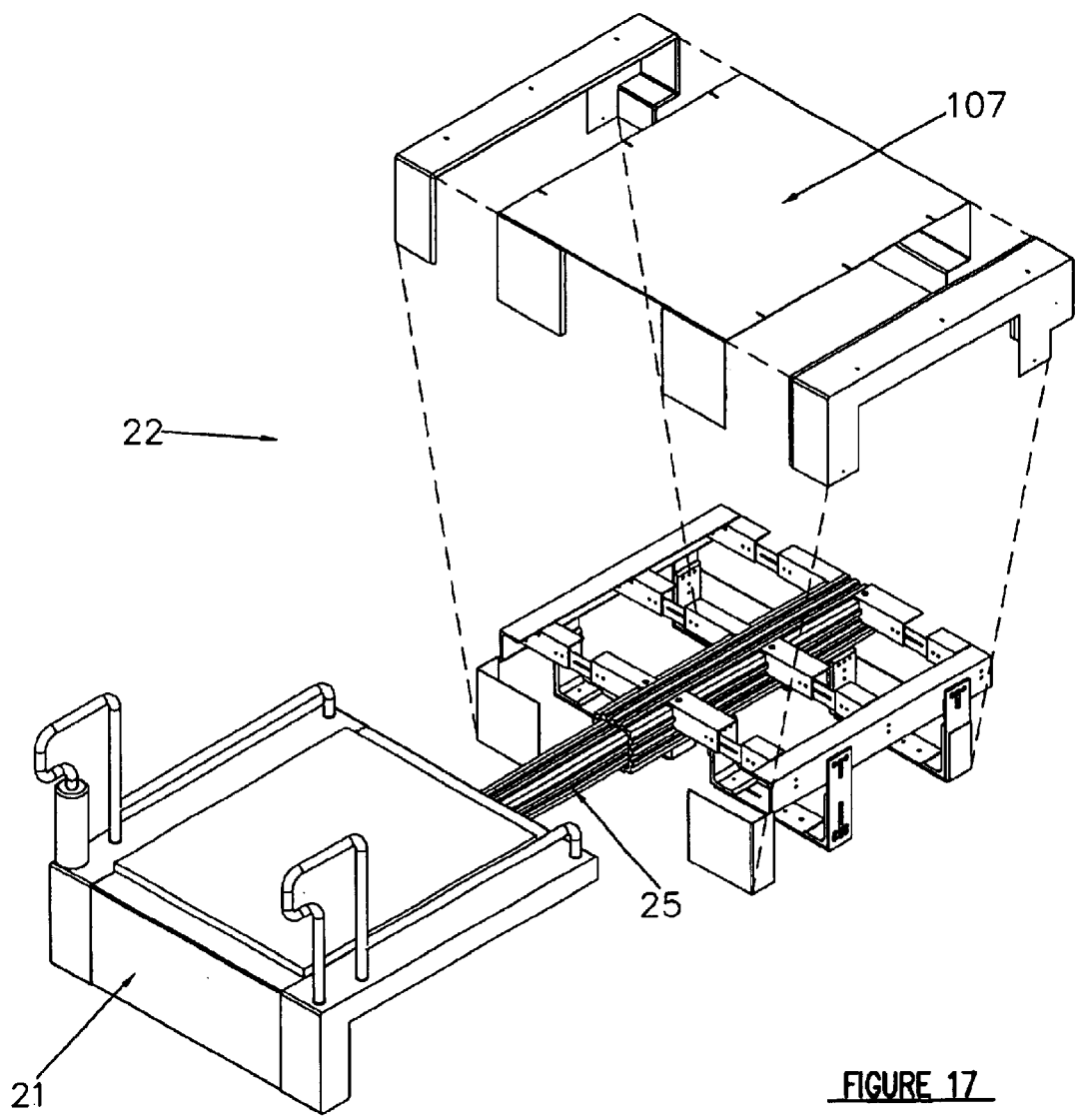
FIG. 17 is an isometric view of the transport apparatus of FIG. 16, shown with the cladding on the base unit exploded.

Cladding 107 is provided over the base unit 22 (see FIG. 16). The cladding 107 is much like the cladding 29 for the platform 21 in that there is a central piece and side, or end, pieces overlapping the central piece. This arrangement again allows for an adjustment in width of the base unit.

The installation of the transport apparatus 11 will now be described. The bagwell 19 space that is to receive the apparatus is a space next to a check station 15 or between two check stations. The base unit is fully contained and is located in the bagwell space on the floor 87. For installation purposes, the cladding 107 is removed from the base unit. The base unit 22 is centered in the bagwell 19 and the width of the base unit is adjusted to match that of the bagwell. The width is adjusted by telescoping the ribs 105 and by adjusting the spacing between the angle brackets 95, 99. Then, the floor plates 101 are bolted to the floor. The cladding 107 is then replaced.

Figure 20:
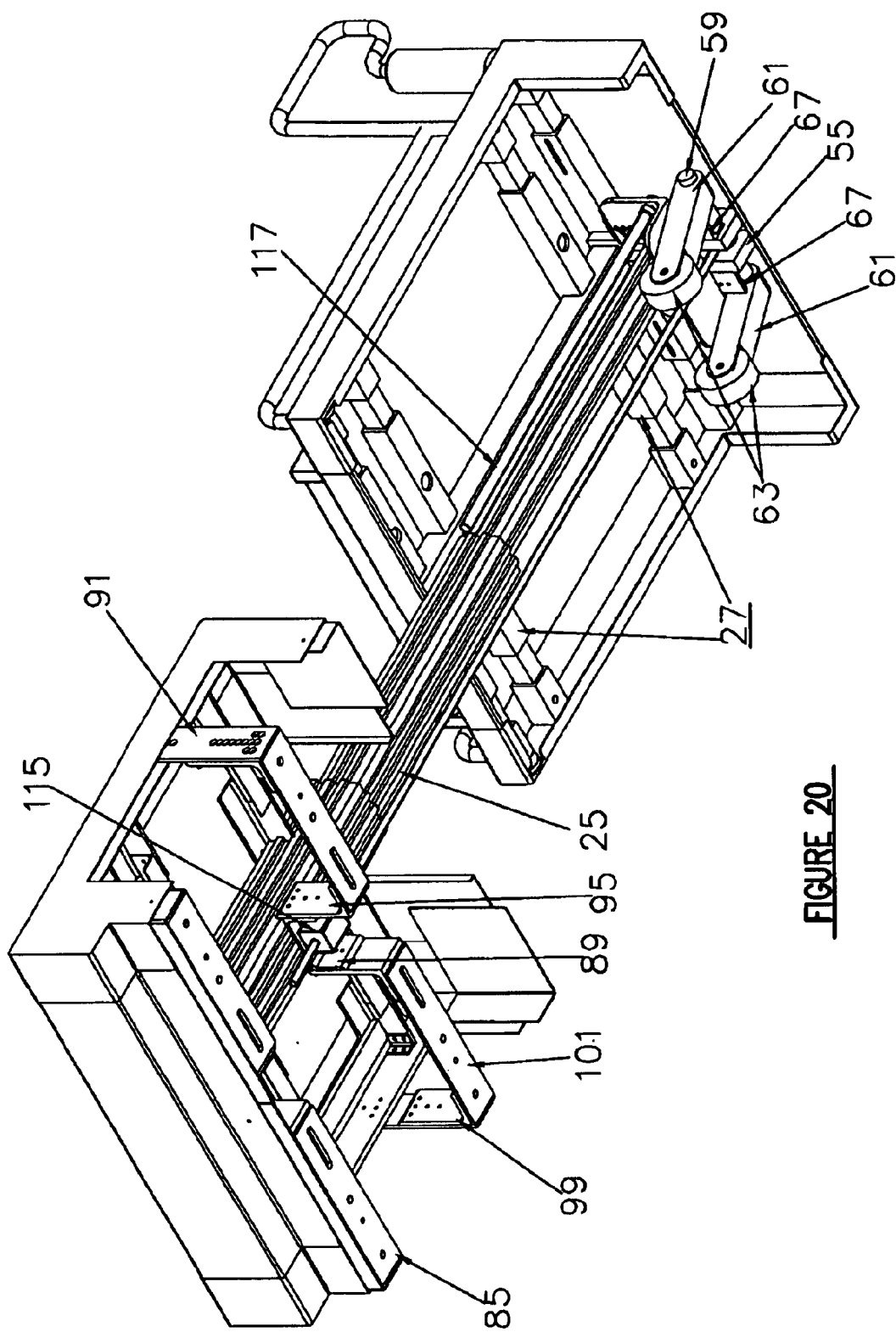
FIG. 20 is an isometric view of the transport apparatus of FIG. 19 from underneath, showing conduits for the scale and for automatic extension.

Note that as shown in FIG. 3, and FIG. 20, conduits 109 carrying electrical power, data, etc. can extend beneath the base unit, between the two support structures 85.

The height of the base unit 22 can also be adjusted to accommodate the particular circumstances of the check station. The height of the base unit is raised or lowered accordingly. Likewise, the height of the platform is adjusted by positioning the stop brackets 65 for the rollers 63.

Once installed, the apparatus is used to transport baggage across the aisle 23, or other distance. The agent or operator pushes or pulls the platform 21 out of the bagwell 19 toward the conveyor 17. The arms 73, 75 extend, with the rollers 63 moving on the floor 87, to a skirt of the baggage conveyor 17. The baggage can then be moved from the platform to the baggage conveyor. Subsequent to the off loading of the baggage, the agent moves the platform 21 back into the bagwell 19 and the arm assembly retracts.

A retaining mechanism can be provided to retain the platform in the retracted position (inside of the bagwell) and the extended position (abutting the baggage conveyor). In the preferred embodiment, the retaining mechanism is a spring loaded transverse pin that extends through the arms 71,73,75. The pin is retracted using a pedal operated cable; the spring pushes the pin back in place. Alternatively, a groove or detent can be provided in a side of the arms for receiving one of the roller bearings. For example, in the retracted position, the intermediate arm 73 can have a detent on one side of its rear end, for receiving the respective outer arm bearing, and the inner arm has a detent on one side of its rear end for receiving the respective intermediate arm bearing.

Figure 13:
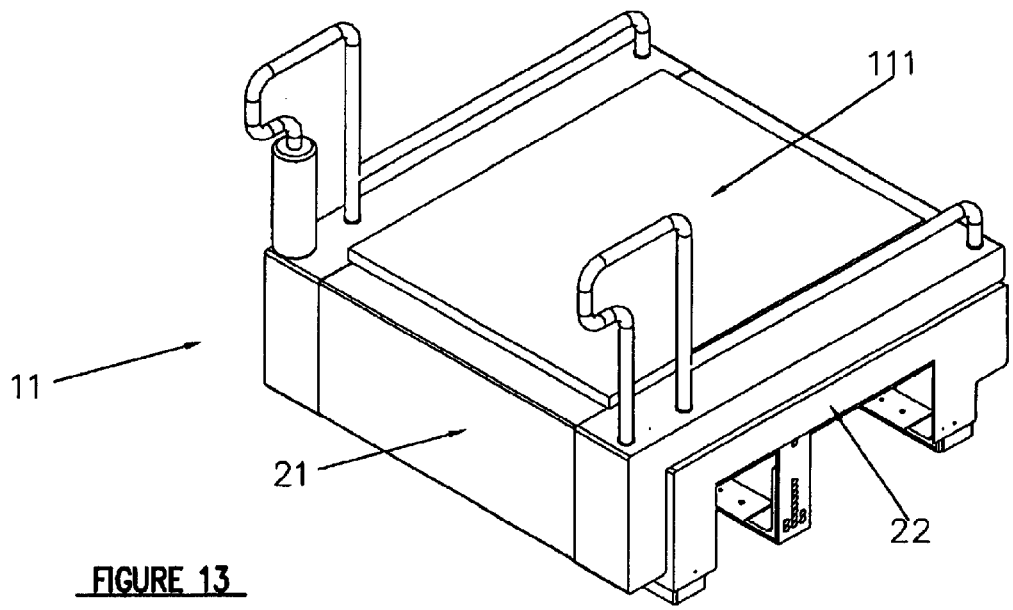
FIG. 13 is an isometric view of the transport apparatus, shown from the customer service agent, or aisle, side, in a retracted position. An optional scale is shown.
Figure 14:
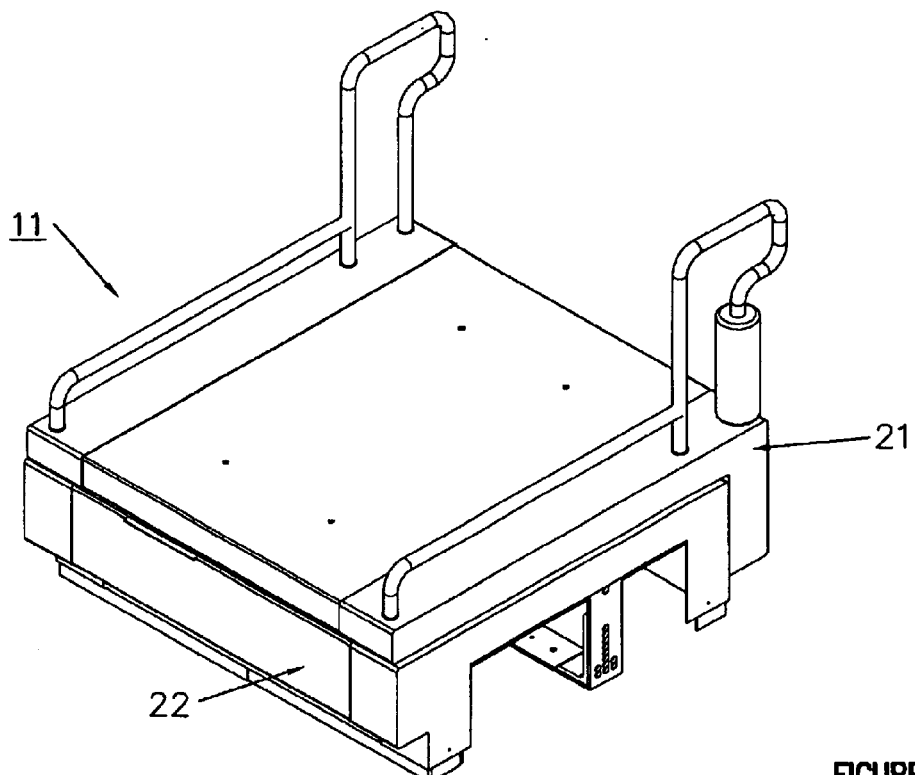
FIG. 14 is an isometric view of the transport apparatus, shown from the passenger's side, in a retracted position, without a scale.

The platform 21 can be provided with a scale 111, as shown in FIG. 13, so that baggage can be weighed. Alternatively, a scale need not be used, as shown in FIG. 14.

Figure 19:
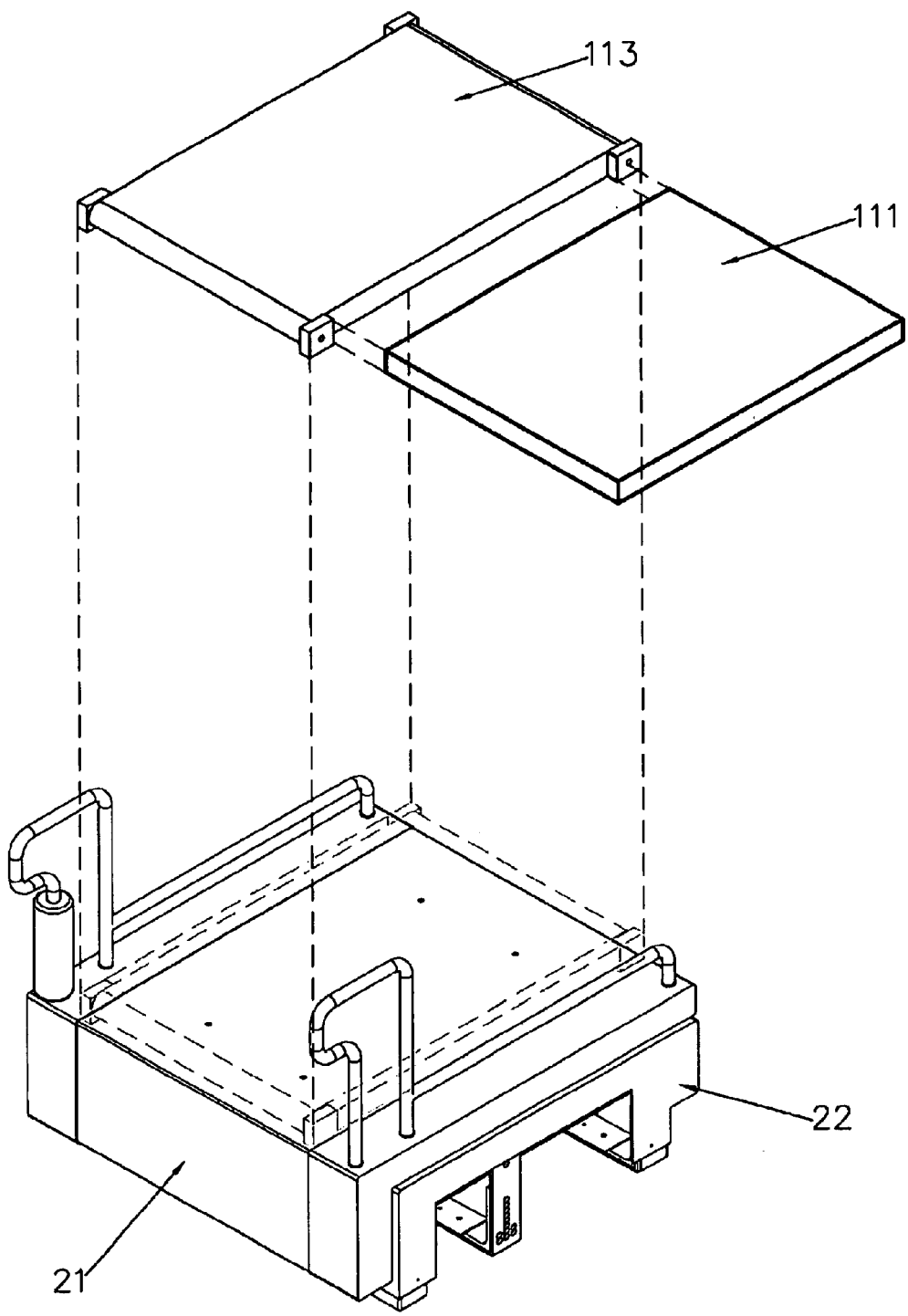
FIG. 19 is an isometric view of the transport apparatus, shown from the customer service agent's side, with an optional scale enclosed within a conveyor.

FIG. 19 shows the transport apparatus in accordance with another embodiment. In this embodiment, a conveyor 113 and scale 111 are provided on top of the platform. The baggage is placed on the conveyor 113. When activated, the conveyor 113 moves the baggage on top of the platform to the conveyor 17. Thus, the ticket agent need only pull the platform from the retracted position to the extended position against the conveyor 17. With the scale inside of the conveyor, the baggage can also be weighed. The motor for the conveyor 113 can be located inside the conveyor or in the platform 21.

FIG. 20 shows another embodiment wherein the platform is extended and retracted automatically. A linear actuator 115 is provided to extend the arm assembly and also to retract it. This embodiment is automatic: an operator initiates extension and retraction of the platform 21 with a switch. In extension, the actuator 115 extends the platform 21 to the conveyor 17; the arm assembly 25 telescopes to extend in length. In retraction, the reverse occurs. In this automatically extending and retracting embodiment, safety features can be used. For example, sensors can stop extension and/or retraction where there is an obstruction between the platform 21 and the conveyor 17 or in the bagwell on the base unit 22. A quick shutoff or kill switch can also be provided for the operator to use. FIG. 20 also shows a conduit 117 for wires for the scale 111.

The transport apparatus 11 provides several advantages over existing devices and methods for moving baggage. It not only reduces the risk of worker injuries, such as back injuries, but the apparatus is easy to use. The arm assembly 25, with bearings on all sides of the arm lengths, and in each end of an arm length, is designed to smoothly extend and retract with minimal effort, much like a drawer. The apparatus is relatively low in cost and requires little maintenance. Installation is also simple, requiring minimal labor. The apparatus can fit in bagwells of various dimensions. The centrally located arm assembly 25 takes up little width, while the cladding can be adjusted in width to effectively fit the platform to the bagwell width. Once the platform 21 is extended, the base unit is covered with cladding 107 for safety.

The transport apparatus 11 is built with extruded tubing in the platform and base unit frames, as well as in the arm assembly 25. The use of extruded tubing lessens the cost of manufacture. Although the arm assembly 25 has been described as having rectangularly shaped arms, in transverse cross-section, the arms could be some other shape, such as triangular.

The foregoing disclosure and showings made in the drawings are merely illustrative of the principles of this invention and are not to be interpreted in a limiting sense.

What is claimed is:

1. An apparatus for transporting objects from a check station to a conveyor system, comprising:
    a) an arm structured and arranged to be located near the check station, the arm capable of extending and retracting along its length, the arm having a free end, the arm comprising a telescoping arm, the arm comprising arm lengths having at least three sides, with bearings on each side between the telescoping arm lengths;
    b) a roller mounted in proximity to the free end of the arm, the roller structured and arranged to bear on a bearing surface during the extension and retraction of the arm;
    c) a platform coupled to the arm, the platform overlying the arm so as to be capable of receiving objects, the platform moving as the arm extends and retracts.

2. The apparatus of claim 1 further comprising floor brackets for coupling the arm to the bearing surface, the floor brackets allowing the vertical orientation of the arm to be adjusted.

3. The apparatus of claim 2 wherein the roller depends from the arm a distance that is adjustable.

4. The apparatus of claim 1 further comprising a handle coupled to the platform, the handle having a roller that is structured and arranged to contact objects on the platform.

5. The apparatus of claim 1 wherein the platform is cantilevered over the arm.

6. The apparatus of claim 1 wherein the platform comprises a scale.

7. The apparatus of claim 1 wherein the platform has an area dimension, with at least one of the dimensions being adjustable.

8. An apparatus for transporting objects from a check station to a conveyor system, comprising:
    a) an arm structured and arranged to be located near the check station, the arm capable of extending and retracting along its length, the arm having a free end;
    b) a roller mounted in proximity to the free end of the arm, the roller structured and arranged to bear on a bearing surface during the extension and retraction of the arm;
    c) a platform coupled to the arm, the platform overlying the arm so as to be capable of receiving objects, the platform moving as the arm extends and retracts;
    d) the arm comprises a telescoping arm;
    e) the telescoping arm comprises arm lengths having at least three sides, with bearings on each side between the telescoping arm lengths;
    f) floor brackets for coupling the arm to a bearing surface, the floor brackets allowing the vertical orientation of the arm to be adjusted;
    g) the roller depends from the arm a distance that is adjustable.

9. A system for checking baggage, comprising:
    a) a check station;
    b) a conveyor separated from the check station by a distance;
    c) a well located adjacent to the check station;
    d) an arm structured and arranged to be located in the well, the arm capable of extending and retracting along its length across the distance, the arm comprising a telescoping arm, the telescoping arm comprising arm lengths having at least three sides, with bearings on each side between the telescoping arm lengths;
    e) a base unit located in the well and containing a portion of the arm;
    f) a platform coupled to the arm, the platform overlying the base unit so as to be capable of receiving baggage, the platform crossing the distance when the arm extends and retracts.

10. The system of claim 9 further comprising a roller mounted in proximity to the free end of the arm, the roller structured and arranged to bear on a bearing surface during the extension and retraction of the arm.

11. The system of claim 9 wherein:
    a) the base unit comprises floor brackets for coupling the arm to a bearing surface, the floor brackets allowing the height of the arm to be adjusted;
    b) a roller mounted in proximity to the free end of the arm, the roller structured and arranged to bear on a bearing surface during the extension and retraction of the arm.

12. A system for checking baggage, comprising:
    a) a check station;
    b) a conveyor separated from the check station by a distance;
    c) a well located adjacent to the check station;
    d) an arm structured and arranged to be located in the well, the arm capable of extending and retracting along its length across the distance;
    e) a base unit located in the well and containing a portion of the arm;
    f) a platform coupled to the arm, the platform overlying the base unit so as to be capable of receiving baggage, the platform crossing the distance when the arm extends and retracts;
    g) the base unit further comprises floor brackets for coupling the arm to a bearing surface, the floor brackets allowing the height of the arm to be adjusted.

13. A method of transporting baggage between a bagwell and a baggage conveyor, comprising the steps of:
    a) providing a platform in the bagwell, the platform is structured and arranged to receive baggage;
    b) telescoping the platform from the bagwell to the baggage conveyor;
    c) exposing a base unit in the bagwell as the platform telescopes to the baggage conveyor:
    d) retracting the platform back into the bagwell.

14. A method of installing a transport apparatus in a bagwell, the transport apparatus having a telescoping arm and a platform coupled to one end of the arm, the platform having at least one roller structured and arranged to bear on a floor, comprising the steps of:
    a) locating the arm in the bagwell and adjusting the height of the arm;
    b) placing a cover over the arm in the bagwell;
    c) adjusting the height of the platform by adjusting the height of the roller.

15. The method of claim 14 further comprising the steps of:
    a) adjusting the width of the cover in the bagwell relative to the bagwell;
    b) adjusting the width of the platform.

* * * * *